United States Patent [19]

Eisele

[11] 4,166,998
[45] Sep. 4, 1979

[54] FORCE TRANSDUCER

[75] Inventor: Walter H. Eisele, Malibu, Calif.

[73] Assignee: Gould Inc., Statham Instrument Division, Oxnard, Calif.

[21] Appl. No.: 808,788

[22] Filed: Jun. 22, 1977

[51] Int. Cl.² .................................................. G01L 1/22
[52] U.S. Cl. ...................................... 338/5; 73/141 A; 338/4
[58] Field of Search .................... 338/2, 4, 5, 36; 73/141 A, 720, 726

[56] References Cited

U.S. PATENT DOCUMENTS

| 3,772,912 | 11/1973 | Andersen | 338/5 X |
| 3,858,143 | 12/1974 | Schaberg | 338/36 X |
| 3,969,935 | 7/1976 | Shoberg | 338/5 X |

Primary Examiner—C. L. Albritton
Attorney, Agent, or Firm—George J. Netter

[57] ABSTRACT

The force transducer includes an essentially symmetrical, beam flexure of generally rectangular platelike construction, one of the edge surfaces being provided with a strain gage. A continuous Z-shaped slotlike passage is formed through the thickness of the beam flexure between its major surface areas, with one cross bar of the "Z" preferably parallel to the edge carrying the strain gage. An enclosing housing supports the beam flexure via a pair of pin members extending through openings provided in the beam flexure and located at one side of the diagonal portion of the "Z". External forces are applied to the beam flexure via a further pin member extending through an opening provided on the other side of the diagonal portion of the "Z". Forces to be measured are applied substantially solely in planes parallel to the major surface planes of the beam flexure. An undersized free-floating pin is located within an enlarged bore provided in the center of the diagonal portion of the "Z" to prevent both operation beyond the most accurate range and damage in the event of exposure to an excessively large force.

9 Claims, 5 Drawing Figures

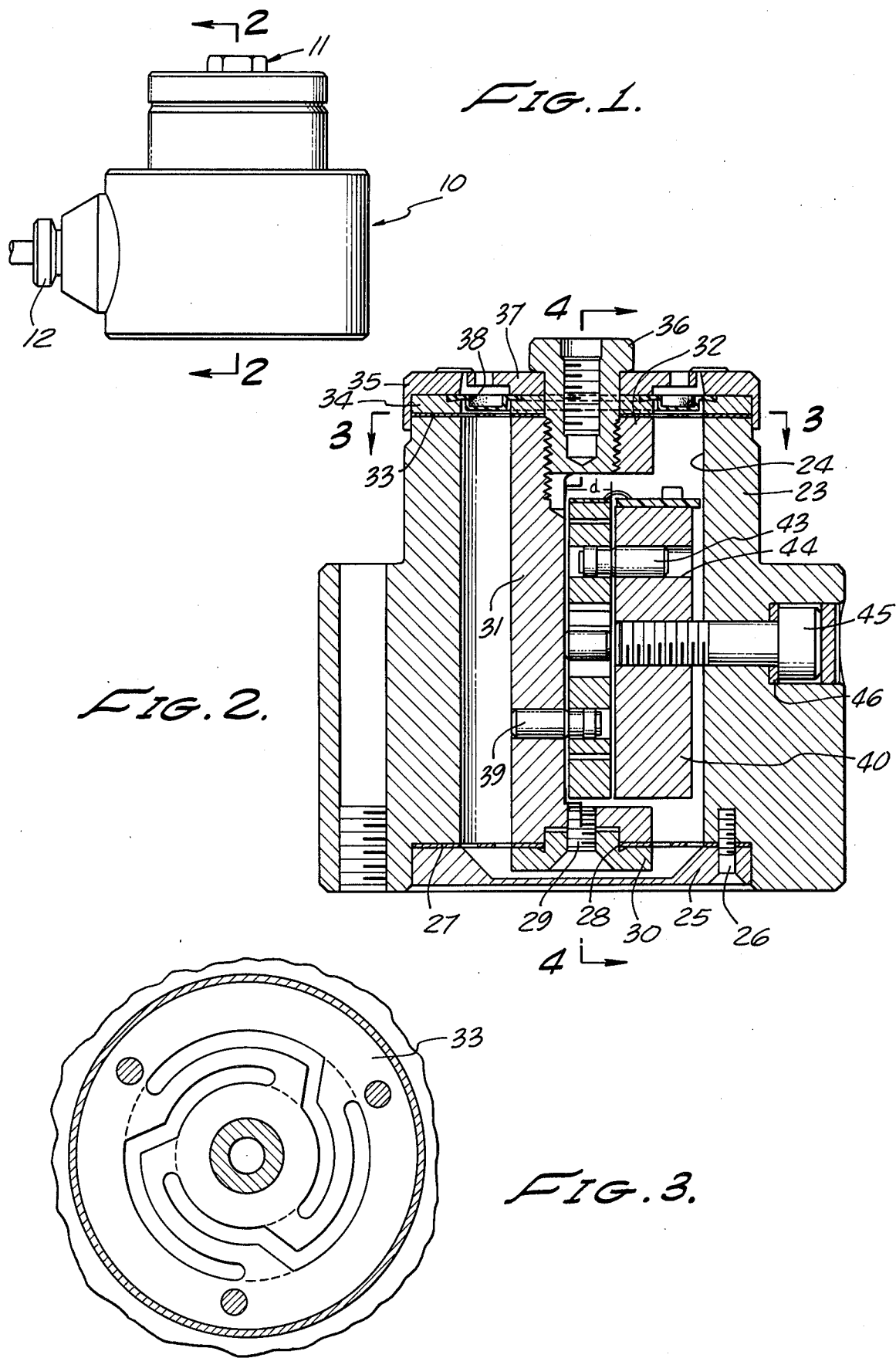

4,166,998

FORCE TRANSDUCER

The present invention relates to a force transducer, and, more particularly, to a beam flexure on which a strain gage is received as the active sensing element of the transducer.

BACKGROUND OF THE INVENTION

A widely used form of force transducer includes a strain gage which, upon being subjected to a deforming force or strain, experiences a modification of its electrical resistance, the degree of change in resistance being a direct measure of the applied force. A most satisfactory form of such a force transducer has been found to be provided by depositing a thin-film resistor bridge onto a surface of a beam or beam flexure which is directly connected to the force to be measured. In use, the force to be measured produces a deflection in the beam flexure which acts on the resistance bridge so that when electrically interconnected with proper measuring equipment, the bridge provides a direct electrical indication of the amount of force.

SUMMARY OF THE INVENTION

In the practice of the present invention, a beam flexure is provided on which a strain gage has been placed, the beam flexure being con-figured so that forces applied to it will produce uniformly repeatable bending moments at the surface on which the strain gage is mounted with substantially no torquing or bending outside the preferred plane of movement of the beam flexure. The beam flexure is of generally rectangular, platelike construction, one of the edge surfaces being provided with a strain gage bridge pattern. A continuous Z-shaped slotlike passage is formed through the thickness of the beam flexure between its major surface areas with one of the cross bars of the "Z" preferably parallel to the edge surface carrying the strain gage. An enclosing housing supports the beam flexure via a pair of pin members extending through openings provided in the beam flexure and located at one side of the diagonal portion of the "Z". External forces are applied to the beam flexure via a further pin member extending through an opening provided at a point on the other side of the diagonal portion of the "Z". Forces to be measured are applied substantially solely in planes parallel to the major surface planes of the beam flexure.

A further aspect of the invention is the provision of an undersized free-floating pin within an enlarged bore provided in the center of the diagonal portion of the "Z". The pin prevents both deflection of the beam flexure beyond its most accurate range and resultant damage in the event of exposure to an excessively large force.

DESCRIPTION OF THE DRAWING

FIG. 1 is a side elevation view of a force transducer constructed in accordance with the present invention.

FIG. 2 is a sectional, elevation view taken along the line 2—2 of FIG. 1.

FIG. 3 is a plan, sectional view, taken along the line 3—3 of FIG. 2.

DESCRIPTION OF A PREFERRED EMBODIMENT

Figure 4:
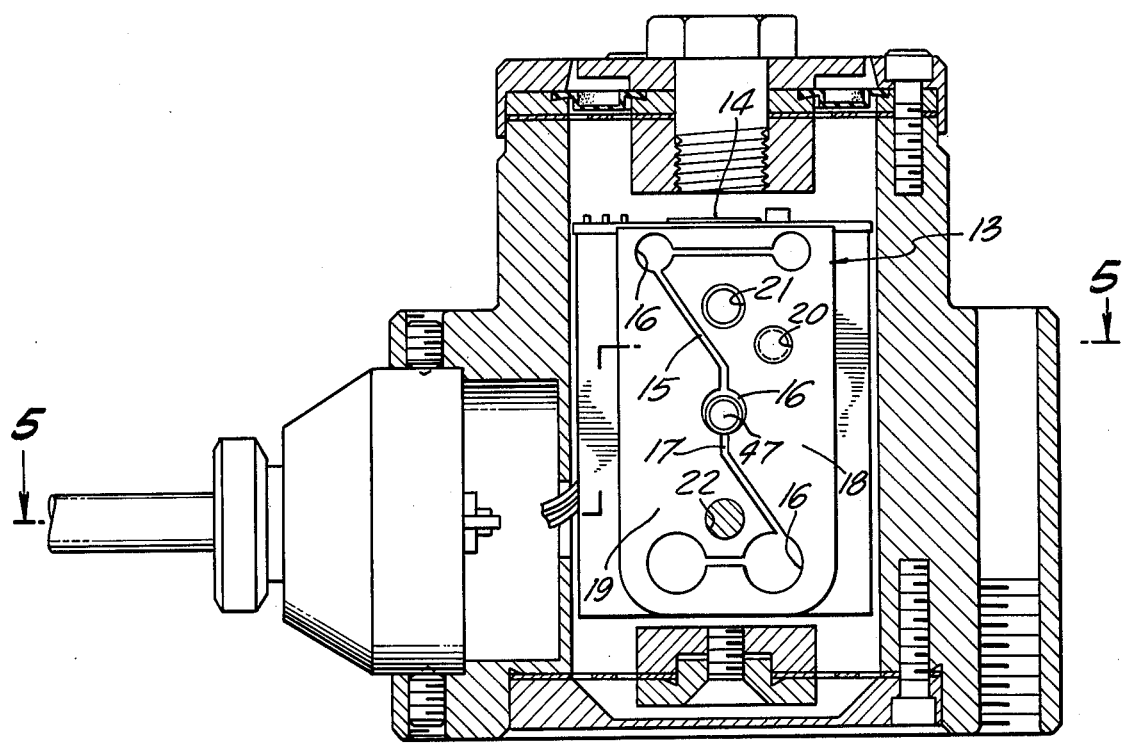
FIG. 4 is a sectional, elevational, view taken along the line 4—4 of FIG. 2.

With reference now to the drawing and particularly to FIG. 1, the force transducer or load cell 10 of the present invention comprise a member 11 via which force to be measured is applied to the transducer and an electrical connection 12, removably interconnected with the transducer, via which electric signals produced by the transducer are provided to remotely located electrical processing equipment. It is customary for transducers such as the transducer 10 to be hermetically sealed and the connection means for applying the force and effecting electrical connection therewith to also be self-sealing to protect the transducer parts from adverse external environments.

Turning now to both FIGS. 2 and 4, the basic transducing means includes a beam flexure 13 having a strain gate 14 applied to one edge thereof, such that when force is applied to the beam flexure 13, corresponding strains will be induced in the gage 14, which, in a way well known in the art, are transformed into electric signals indicative of the amount of strain and thus the amount of force producing the strain. Although various kinds of strain gages may be used for the gage 14, it is contemplated that the preferred gage is made up of a plurality of thin-film deposited resistors electrically interconnected in the form of a bridge, whereby the strain produced in the beam flexure 13 produces variations in the bridge resistance effecting a corresponding change in electric signal output from a constant applied input electrical potential or current. The beam flexure itself must be made from a material, such as metal, which has good spring properties and is amenable to thin film deposition of the strain gages.

The beam flexure 13 is a one-piece platelike body of preferably uniform thickness d and of rectangular geometry. The surface at one end is faced off to receive the gage 14 thereon as can be best seen in FIG. 4. A continuous, generally Z-shaped slotlike passage 15 is formed through the major vertical surfaces of the beam flexure, passing completely through the body of the beam flexure. The two cross members of the "Z" are located immediately adjacent opposite ends of the beam flexure and are preferably parallel with the edge surfaces thereof; however, such parallelism is not critical. The "Z" passage also includes enlarged through passages at the cross member ends to provide needed flexibility and stress concentrations and at the center of the diagonal part to provide for an overtravel stop, both as indicated at 16. Two parts 17 of the "Z" passage into the central opening 16 and extend longitudinally in substantial alignment with the longitudinal axis of the beam flexure. The longitudinal orientation of parts 17 ensures that the portions of the beam flexure on either side thereof can move more or less equally in the upward and downward directions. If parts 17 were diagonally oriented, the beam flexure would be essentially unidirectional since the slotlike passage would close more quickly under compression loading. The slotlike passage and associated enlarged openings effectively separate the beam flexure into a first, fixed portion 18 which can be flexed to move in a cantilever manner with respect to a second, movable portion 19, the two beam flexure portions lying generally at opposite sides of the slot diagonal. The openings 16 beneath strain gage 14 are sized to produce a desired degree of flexibility and stress concentration for the gage support. The openings 16 at the opposite end of the beam flexure may be varied in size as desired to control the overall spring rate of the device, as needed to accommodate operation in various force ranges. As illustrated in FIG. 4, the openings 16 at the opposite end of the beam flexure are located more closely to the bottom edge of the flexure plate than to the side edge, such that an essentially tapered cantilever support is provided for the movable portion 19 which will experience rather uniform stresses along its length during deflection. Because the two portions 18 and 19 each absorb a portion of the deflection applied to the transducer, larger loads may be measured without exceeding the strain limitations of gage 14 than would be possible with prior force transducers.

A pair of mounting openings 20 and 21 are formed in the fixed portion 18. A further opening 22 is formed in the movable portion 19, both openings 21 and 22 lying on the longitudinal axis of the beam flexure, as viewed in FIG. 4. Opening 20 is tapped and may be located as convenient in fixed portion 18.

With reference now particularly to FIG. 2, the housing 23 for the force transducer is seen to be of generally hollow, cylindrical shape, with a cylindrical bore 24 which extends completely therethrough. The lower end of the transducer, as illustrated, is closed by a cover plate 25 affixed to housing 23 by screws 26. The outer edge margin of a circular leaf spring 27 of the type shown in FIG. 3 is clamped between the cover plate 25 and the housing 23 to provide both proper location and attachment of spring 27. The central portion of the spring 27 includes an opening 28 through which a threaded member 29 and an insert 30 extend to make engagement with a drive member 31 which extends vertically the full length of the cylindrical bore 24. Thus, drive member 31 is resiliently supported on spring 27, such that longitudinal movement of drive member 31 is resisted by the force of spring 27; whereas, side to side motion of drive member 31 is minimized.

The upper end of drive member 31 is formed into a threaded nut 32. A circular leaf spring 33 rests on the upper surface of nut 32 with its outer edge margin located on the upper edge of the cylindrical housing 23. An annular washer 34 is received over spring 33; and an annular cap 35, over the washer 34. A threaded fitting 36 with a bushing or spacer 37 received on its shank is threaded into the nutlike end 32 of the drive member 31. A rubber or plastic ring seal 38 prevents the ingress of contaminants between the spacer and the housing wall. A pin 39 is affixed to the member 31 in position to extend into opening 22 in movable portion 19 of the beam flexure.

The longitudinal axes of screw 29 and nut 32 are collinear with each other and with the longitudinal axis of the beam flexure. Since these longitudinal axes are aligned, forces applied via fitting 36 are solely longitudinal, with substantially no torquing or rocking of drive member 31. Leaf springs 27 and 33 provide bidirectional longitudinal resiliency for drive member 31, so that forces either downwardly or upwardly directed as shown in FIG. 2 may be measured.

Figure 5:
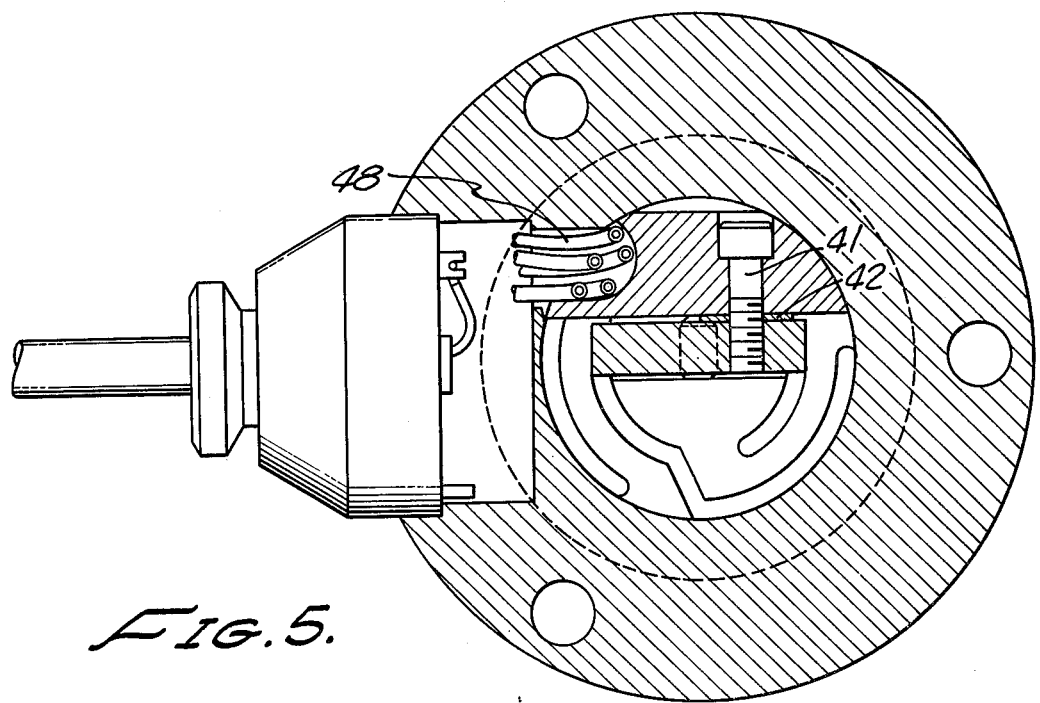
FIG. 5 is a further plan sectional view, taken along the line 5—5 of FIG. 4.

A generally semicylindrical mounting plate 40 is located in bore 24. Beam flexure 13 is secured to a flat surface of plate 40 by means of a machine screw 41 extending into tapped opening 20, with a washer 42 maintaining a slightly spaced condition between the parts (FIG. 5). A smooth pin 43 (FIG. 2) is received within both opening 21 and a matching opening 44 in mounting plate 40 to locate beam flexure 13 on mounting plate 40 and prevent its rotation about screw 41. Also, an undersized, free floating cylindrical pin 47 is located in the central opening 16 between the passage portions 17.

Mounting the plate 40 with beam flexure 13 previously mounted thereon is secured to housing 23 by screw 45 which is sealed by a suitable washer 46. In conventional manner, electrical connections to the resistor strain gage 14 are made with the connector 12 via wires 48.

With simultaneous reference to both FIGS. 2 and 4, downward forces applied to the fixture 36 move the drive member 31 downward, and, by virtue of the mechanical connection through pin 39, movable portion 19 deflects downward. Since fixed portion 18 is secured against movement in this direction, a flexing or bending is produced in beam flexure 13. Flexing of the beam 13 produces a corresponding strain in the strain gage 14, resulting in an output signal through connection 12 which is a functional equivalent of the force to be measured. If the transducer is subjected to an excessive loading, pin 47 will prevent over flexing or bending of the beam flexure 13.

I claim:

1. A force measuring load cell having a strain gage as the force transducer, comprising:
   a platelike body having a pair of major surface areas and a peripheral edge surface, said edge surface having a portion formed into a flat, on which said strain gage is located;
   a first elongated slotlike opening passing through both major surfaces of said body and extending closely adjacent to said edge surface flat and forming a beam therebetween;
   a second elongated opening passing through both major surfaces of said body and spaced from said first opening;
   a diagonal opening passing through both major surfaces of said body and interconnecting opposite ends of said first and second openings;
   means interconnected with said body solely on one side of said diagonal opening for supporting said body; and
   means interconnected with said body on the other side of said diagonal opening for applying a force to be measured to said body along a direction transverse to said flat and said strain gage.

2. A force measuring load cell as in claim 1, in which said diagonal slotlike opening includes an enlarged centrally located portion and said force applying means is interconnected with said body at a point lying on a line passing through said enlarged centrally located opening and intersecting said flat at substantially ninety degrees.

3. A force measuring load cell as in claim 1, in which said force applying means includes a member extending spaced from a major surface of said flexure body, and a pin secured to said member received within an accommodating opening in said flexure body.

4. A force measuring load cell as in claim 3, in which said member is resiliently supported so as to return to a neutral position on removal of force to be measured therefrom.

5. A beam flexure for use in a force measuring load cell, comprising:
   a resilient body having a pair of major surfaces and a peripheral edge surface extending between said surfaces, said edge surface having a portion formed into a flat for receiving at least one strain gage thereon;

a first elongated slotlike opening passing through both of said major surfaces and extending closely adjacent to said flat on said edge surface to define a beam flexure between said opening and said flat;

a second elongated slotlike opening also passing through both of said major surfaces at a location spaced from said first elongated slotlike opening;

a diagonal elongated slotlike opening interconnecting opposite ends of said first and second elongated slotlike openings;

means located on one side of said diagonal elongated slotlike opening for facilitating mounting of said body in a load cell; and means located on the other side of said diagonal elongated slotlike opening for facilitating applying a force to be measured to said resilient body along a direction transverse to said flat.

6. A beam flexure as in claim 5, wherein said diagonal elongated slotlike opening comprises an enlarged portion having a free-floating undersized pin located therein.

7. A beam flexure as in claim 5, wherein said diagonal elongated slotlike opening comprises a portion extending at substantially a right angle to said first and second elongated slotlike openings, said portion comprising an enlarged portion having a free-floating undersized pin located therein.

8. A beam flexure, comprising:

a metal body having a pair of substantially parallel major surfaces and a relatively thin edge extending therebetween;

a pair of substantially parallel, elongated, slotlike openings passing through said body between said major surfaces, at least one of said slotlike openings being located closely adjacent said thin edge such that an elongated metal beam lies between said one slotlike opening and said thin edge; and a diagonally extending slotlike opening interconnecting opposite ends of said pair of slotlike openings to provide collectively a continuous opening of overall Z-shape, said diagonal opening comprising an enlarged portion having a free-floating undersized pin located therein.

9. A beam flexure as in claim 8, wherein said diagonal opening further comprises a portion extending into said enlarged portion at substantially a right angle to said pair of slotlike openings.

* * * * *